US006289563B1

(12) United States Patent
Watkins

(10) Patent No.: US 6,289,563 B1
(45) **Date of Patent: *Sep. 18, 2001**

(54) SELF-ADJUSTING VERTICAL BLIND SLOT REPAIR KIT

(76) Inventor: Timothy Joseph Watkins, P.O. Box 11281, Glendale, AZ (US) 85318

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/080,486

(22) Filed: May 18, 1998

(51) Int. Cl.[7] .......... B23P 19/04
(52) U.S. Cl. .......... 29/24.5; 160/900; 428/40.1
(58) Field of Search .......... 29/24.5, 402.11, 29/402.12, 402.14, 402.09; 428/99, 134, 100, 131, 40.1, 178.1; 160/900

(56) References Cited

U.S. PATENT DOCUMENTS

| | | | | |
|---|---|---|---|---|
| 3,785,451 | * | 1/1974 | McCord | 428/99 X |
| 4,016,977 | * | 4/1977 | Krautsack | 428/40.1 X |
| 4,431,325 | * | 2/1984 | Colby . | |
| 4,475,579 | * | 10/1984 | Bassett | 160/236 X |
| 4,525,399 | | 6/1985 | Fields | 428/43 |
| 4,718,962 | * | 1/1988 | Goodwin . | |
| 4,954,378 | * | 9/1990 | Goodman . | |
| 5,105,870 | * | 4/1992 | Merjane . | |
| 5,180,621 | * | 1/1993 | Heier et al. . | |
| 5,271,447 | * | 12/1993 | Aronovich | 160/236 |
| 5,424,107 | * | 6/1995 | Lee | 428/99 X |
| 5,458,939 | * | 10/1995 | Kitchen | 428/134 X |
| 5,601,899 | * | 2/1997 | Campbell | 428/131 X |
| 5,718,273 | * | 2/1998 | Best et al. . | |

* cited by examiner

*Primary Examiner*—P. W. Echols
*Assistant Examiner*—Steven Blount
(74) *Attorney, Agent, or Firm*—Schmeiger Olson & Watts

(57) ABSTRACT

A new and improved repair kit for vertical blind slat connection points for repairing broken or torn vertical blind slat mounting holes comprising a pliable member that is placed on a torn or broken vertical blind slat, that is self-adjusting to compensate for various thicknesses and supports the weight of a blind slat by a fastener placed through a hole in a vertical blind slat and pliable member whereby the vertical blind slat may be reattached to the blind set thereby restoring its original functionality.

9 Claims, 3 Drawing Sheets

SELF-ADJUSTING VERTICAL BLIND SLOT REPAIR KIT

BACKGROUND

1. Field of Invention

The present invention relates to window shades and more particularly pertains to the repair of vertical blind slats that are torn or broken at the blind slat connection point.

2. Description of Prior Art

The use of repair patches for vertical blind slats is known in the prior art. More specifically, repair patches for vertical blind slats previously devised and utilized for the purpose of repairing broken or torn vertical blind slat mounting holes are known to consist basically of familiar, expected and obvious structural configurations, notwithstaning the myriad of designs encompassed by the crowded prior art which have been developed for the fulfillment of countless objectives and requirements.

The present invention is directed to improving devices for repairing broken or torn vertical blind slat mounting holes in a manner which is safe, secure, economical and aesthetically pleasing.

For example, U.S. Pat. No. 4,662,770 to Block discloses a pressure sensitive reinforcement tape for a loose leaf sheet comprising a strip of plastic tape coated with a pressure sensitive adhesive and includes a plurality of holes configured for alignment with different standard mounting hole configurations and is sized to fit within the confines of the sheet.

U.S. Pat. No. 4,525,399 to Fields shows a perforated reinforcing strip for use with continuous forms having sprocket holes comprising a means for reinforcing the sprocket holes and alternatively additionally comprises means for reinforcing perforations found in said continuous forms; said article comprises a continuous pliable strip having self-adhesive located on one side and having a row of uniformly spaced holes along its length. The strip additionally has perforations which are transverse to the longitudinal axis of the strip and are located between every other hole on the strip.

U.S. Pat. No. 4,954,378 to Goodman describes a repair kit for shower curtains and the like consisting of a reinforcing means for repairing tears in plasticized sheet material for shower curtains and liners, bath curtains, and the like comprising an elastomeric material, manipulatable as a unit, for insertion through an aperture in the sheet material adjacent a tear for adhering to each side of the sheet material around the aperture to reinforce the sheet material.

U.S. Pat. No. 5,458,939 to Kitchen shows a repair patch that is square on the mounting end, that is attached to a broken vertical blind slat by pressure sensitive adhesive, but doesn't account for blind slats of various sizes, or rod attachment points of different sizes, or compensate for effects of extreme weather on the pressure sensitive adhesive used to support the weight of the blind slats.

None of the inventions disclosed above provide an adequate means for larger, heavier and thicker type vertical blinds; nor account for the effects of extreme heat, humidity, or cold on adhesive materials. None of the above inventions solely for repairing blind slats is widely known to the public or sold on a national level.

In this respect, the repair kit for vertical blind slats according to the present invention substantially decreases the conventional concepts and designs of the prior inventions, in so doing provides an apparatus primarily developed for the purpose of repairing broken or torn vertical blind slat mounting holes, for slats of different widths, weights, and compensates for effects of extreme weather.

The present invention achieves its intended objects, and advantages through a new, useful, unobvious combination of methods steps and components with the use of a minimum number of functional parts and a reasonable cost to manufacture with readily available materials.

Objects and Advantages

Accordingly, besides the objects and advantages of the invention's process to repair vertical blind slat connection parts described in the present invention, several additional objects and advantages of my invention are:

a) Provide a new and improved repair kit for vertical blind slats which may be easily and efficiently manufactured.

b) Provide a blind slat repair kit that adjusts to blind slats of various widths and depths.

c) Provide a new and improved repair kit for vertical blind slats which provides in the apparati and methods of the prior art some of the advantages thereof, while simultaneously overcoming some of the disadvantages normally associated therewith.

d) Provides for extreme heat, humidity, and cold weather effects on adhesive used on prior art blind slat repair kits.

e) Provides for slat to rod attachment points of different sizes.

Still yet another object of the present invention is to:

a) Provide a new and improved repair kit for vertical blind slats which will allow reuse of a broken slat thereby maintaining an exact color match with the other slats in the set.

b) Provide a new and improved repair kit for vertical blind slats which is unobtrusive when in use so as not to degrade the appearance of the vertical blind set.

c) Provide a new and improved repair kit for vertical blind slats that may be universally applied to a wide variety of different vertical blind sets thereby precluding the need to manufacture or inventory a large number of different repair patches.

d) Provide a vertical blind slat repair kit that won't cause a blind attachment connection clip to obtrude and cause the slat to hang at a different angle because of the non-tapered edge on the above mentioned prior art.

e) Provide an improved repair kit that supports the weight of a blind slat by a fastener or other suitable means that provides the same effect.

f) Can be used on various blind slats, and placed underneath fabric type blinds.

The foregoing has outlined some of the more pertinent objects of the invention. These objects should be construed to be merely illustrative of some of the more prominent features and applications of the present invention. Many other beneficial results can be attained by applying the disclosed invention in a different manner or by modifying the invention within the scope of the disclosure.

Therefore, it can be appreciated that there exists a continuing need for a new and improved repair kit for vertical blind slats which can be used for repairing broken and torn vertical blind slat mounting holes. In this, the present invention substantially fills this need. As illustrated by the background art, efforts are obviously being made in an attempt to develop devices for repairing broken or torn vertical blind slat mounting holes. No prior effort, however, provides the benefits apparent with the present invention. Additionally, the prior art and commercial techniques do not suggest the inventive combination of component elements and features configured as disclosed and claimed herein.

Still further objects and advantages will become apparent from a consideration of ensuing description and drawings.

DRAWING FIGURES

REFERENCE NUMERALS IN DRAWINGS

Figure 1:
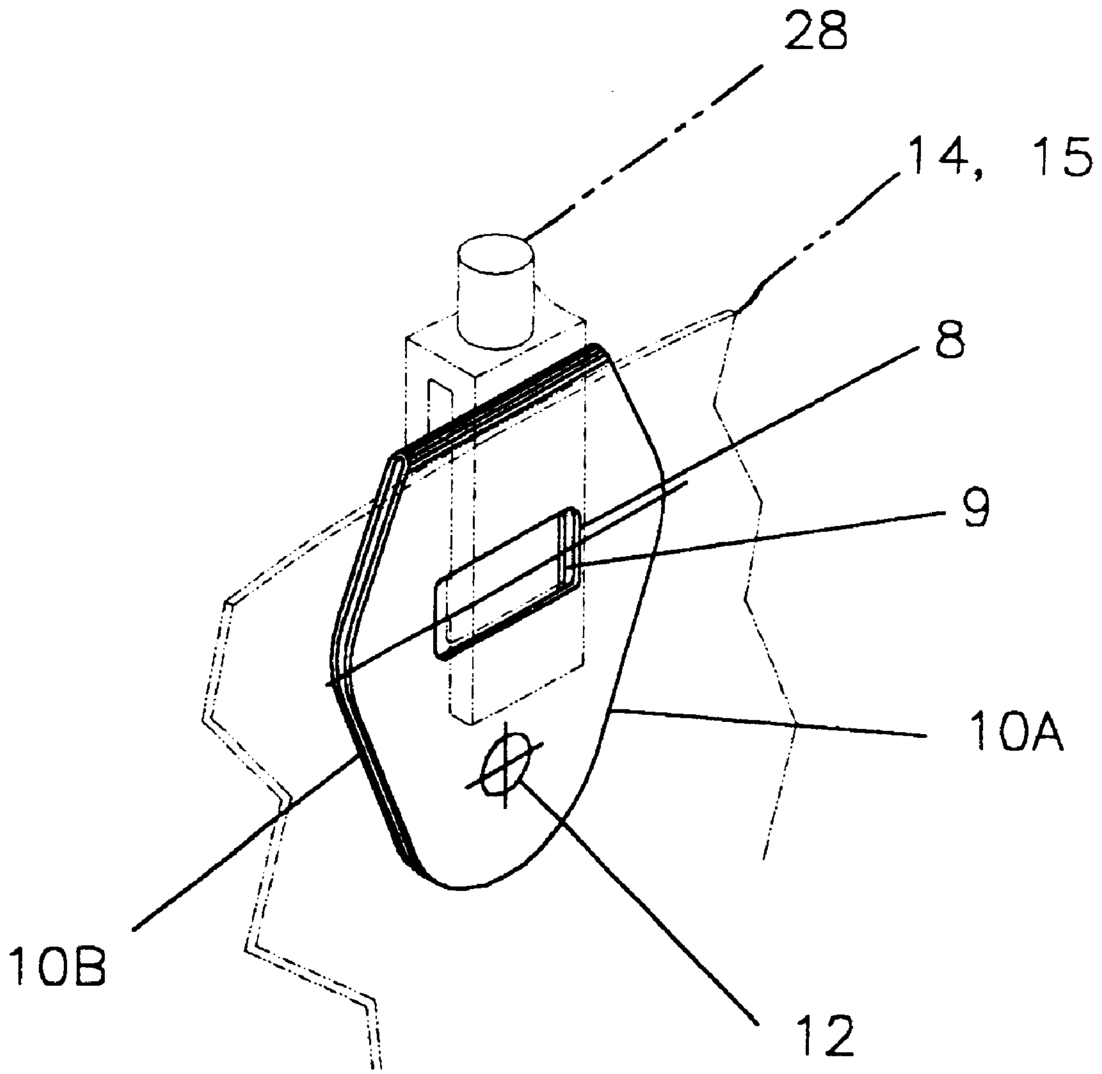
FIG. 1 is a perspective view of a first embodiment of the present invention illustrating its manner of use.

8 Rectangular aperture
9 Elongated Rectangular aperture
10A Right side flap
10B Left side flap
12 Fastener
14 Thin vertical blind slat
15 Thick vertical blind slat
16A Plastic flexible adjustment area
16B Plastic flexible adjustment area
18A Fastener hole
18B Fastener hole
20A Pressure sensitive adhesive foam
20B Pressure sensitive adhesive foam
22A Release paper
22B Release paper
24 Fold line (crease)
26 Adjusted position of repair kit
28 Rod hook assembly
30 Attaching hook
32 Rod hook backing lobe

SUMMARY

In accordance with the present invention, a self-adjusting vertical blind slot repair kit comprises a flat, creased body having two rectangular apertures, one on each side of the crease formed by folding the flaps together, one aperture being noticeably larger than the other. The flat, creased body is attached to a vertical blind slat by a double-sided, pressure sensitive adhesive material located between the repair kit and the blind slat. A fastener passing through a small hole in one flap of the repair kit, the pressure sensitive adhesive material, the blind slat, the remaining piece of pressure sensitive material, and the other flap of the repair kit supports the weight of the blind slat. The adhesive material's only purpose is to keep the repair kit properly oriented with respect to the blind slat, and to keep the hole made in the blind slat from tearing.

These together with other objects of the invention, along with the various features of novelty which characterize the invention, are pointed out with particularity in the claims annexed to and forming part of this disclosure. For a better understanding of the invention, its operating advantages and the specific objects attained by its uses, reference should be made to the accompanying drawings and descriptive matter in which there are illustrated embodiments of the invention.

DESCRIPTION FIGS. 1 to 6

A typical embodiment of the self-adjusting vertical blind slot repair kit is illustrated in FIG. 1 (side view). The repair kit has rectangular apertures (8)(9) of predetermined size to allow the repair kit to cover a broken or torn blind slat connection point (not pictured). The repair kit has one rectangular aperture of a larger size (8) to allow the rod hook assembly's (28) backing lobe (32) to close, thus causing the rod hook assembly not to obtrude.

A thin fold is placed on the top edge (24) of the repair kit to allow the pliable folded flaps (10A)(10B) to close to the adjusted position (26) and insert into a vertical blind slat connection rod hook assembly (28). In the preferred embodiment, the repair kit is a flexible polymer such as poly-ethylene-tere-phthalate. However, the kit may consist of any other material that can be bent without fracturing such as polyethylene, polypropylene, polycarbonate, vinyl nylon, rubber, leather, various impregnated or laminated fibrous materials, various plasticized materials, cardboard, paper, etc.

Figure 2:
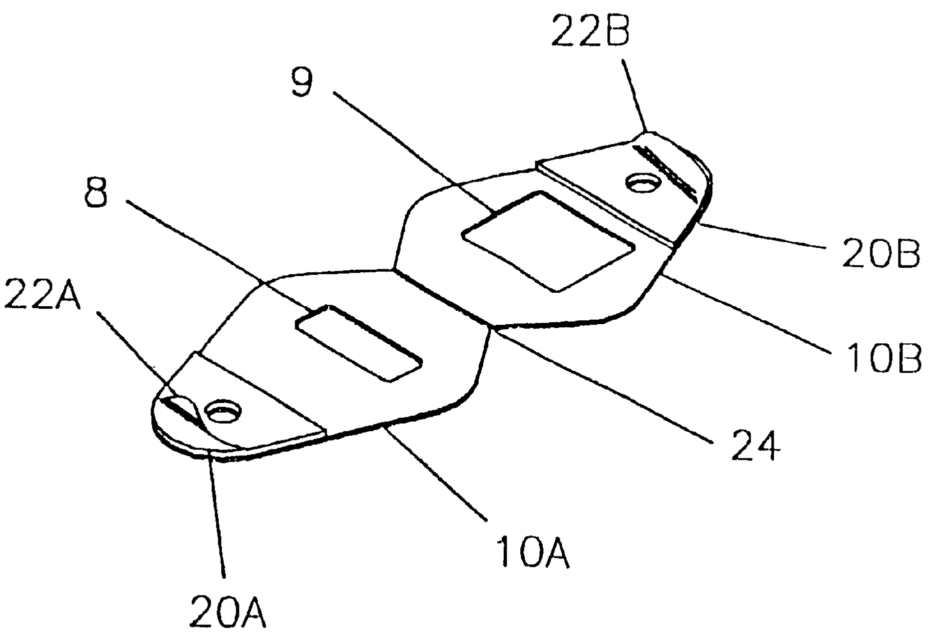
FIG. 2 is a perspective view of the invention of FIG. 1 illustrating its manner of construction.

The inside of the repair kit, FIG. 2, consists of two pieces of pressure sensitive adhesive (20A)(20B) that attach to the fold down flaps (10A)(10B) on the inside of the repair kit. The two pressure sensitive adhesive pieces are to attach the repair kit to the vertical blind slat (14)(15) and to prevent the hole placed in a vertical blind slat from tearing. On both flaps (10A)(10B) there is an opening (18A)(18B) used to place a small fastener (12) through the pressure sensitive adhesive (20A)(20B) and the vertical blind slat (14) to support the weight of a vertical blind slat.

Figure 4:
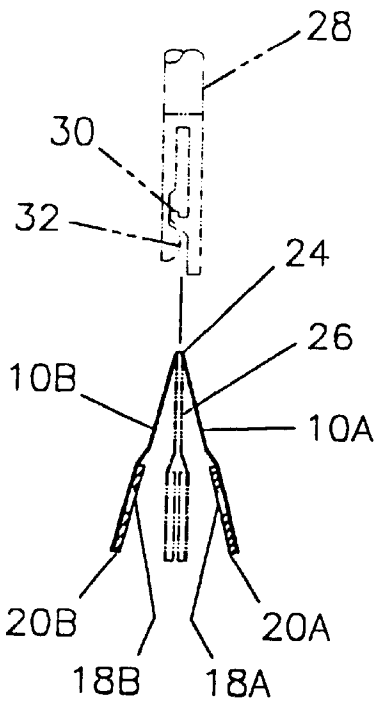
FIG. 4 is a sectional view of the flaps in the open and the adjusted position with a rod connection attachment.

The pressure sensitive adhesive foam is protected by release paper on both sides (22A)(22B) until the repair kit is to be utilized, at which time the release paper is removed on one side and the pressure sensitive adhesive foam is placed on the flaps (10A)(10B) by applying pressure. FIG. 4 shows the flap hole (18B) that allows a small fastener to enter and cause a wedge.

Figure 5:
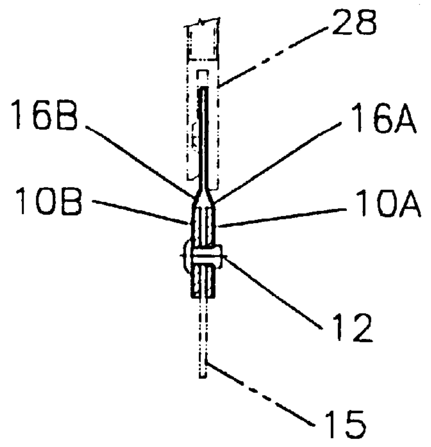
FIG. 5 is a sectional view of the repair kit adjusted with a large commercial-type vertical blind slat.
Figure 6:
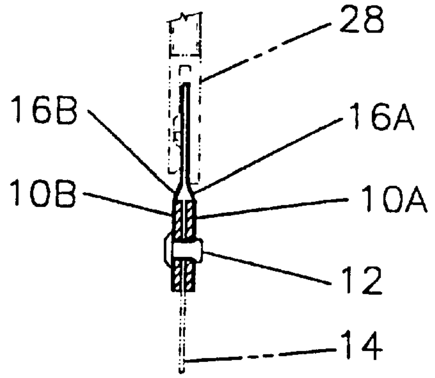
FIG. 6 is a sectional view of the repair kit adjusted with a thin residential-type vertical blind slat.

Because the top half of the repair kit has no foam or adhesive on it and one aperture is larger than the other, FIG. 5 and FIG. 6, it allows the repair kit to be pliable and adjust to blind slats of various thicknesses (14)(15) without causing the rod hook assembly (28) to obtrude and cause a vertical blind slat to hang differently from the other slats without the kit installed.

From the description above, a number of advantages of my self-adjusting vertical blind repair kit become evident:

a) the effects of extreme weather will not have any effect on the fastener used to support the weight of a blind slat.

b) the repair kit is pliable and will adjust to the size of a vertical blind.

c) provide a new and improved repair for vertical blind slats which has all the advantages of the prior art repair patch for vertical blind slats and none of the disadvantages.

d) provide a new and improved repair kit for vertical blind slats which may be easily and efficiently manufactured and marketed.

e) provide a new and improved repair kit for vertical blind slats which is of a durable and reliable construction.

f) provide a new and improved repair kit for vertical blind slats which is inexpensive to manufacture with regard to both materials and labor, and which accordingly reduces the price of sale to the consumer, thereby making such repair kit for vertical blind slats economically available to an increased percentage of the buying public.

g) provide a new and improved repair kit for vertical blind slats which provides in the appartati and methods of the prior art some of the advantages thereof, while simultaneously overcoming some of the disadvantages normally associated therewith.

OPERATION—FIGS. 1, 2, 3, 4, 5, 6

The manner of using the Vertical Blind Slot Repair Kit to repair broken or torn vertical blind connection slots is to remove the release paper, FIG. 2 (22A)(22B), on one side of each piece of pressure sensitive adhesive foam, FIG. 2 (20A)(20B), and place one piece of pressure sensitive adhesive foam on each of the flaps, FIG. 2 (10A)(10B), by aligning the fastener holes in the foam and each of the flaps, FIG. 2 (18A)(18B).

After this portion of the assembly has been completed, position the kit on the blind slat with the edge of its aperture in line with the edge of the mounting hole (possibly either torn or broken) nearest the end of the blind slat. Keeping the kit in place, use a pen or pencil to mark the position of the fastener holes (18A) or (18B) on the blind slat. After removing the kit from the blind slat, use a sharp object to make a hole through the blind slat of a diameter no larger than the fastener hole (18A) or (18B).

Following this portion of the assembly process, the remaining release paper (22A)(22B) is removed and the kit placed in a position to allow the attaching hook (30) to line up with the smaller of the rectangular apertures (8), allowing the blind slat to be placed uniformly with the other blind slats. The kit is is in proper alignment when all the fastener holes (18A)(18B) on the flaps (10A)(10B), the adhesive foam (20A)(20B), and the hole made in the blind slat (14)(15) are colinear.

Figure 3:
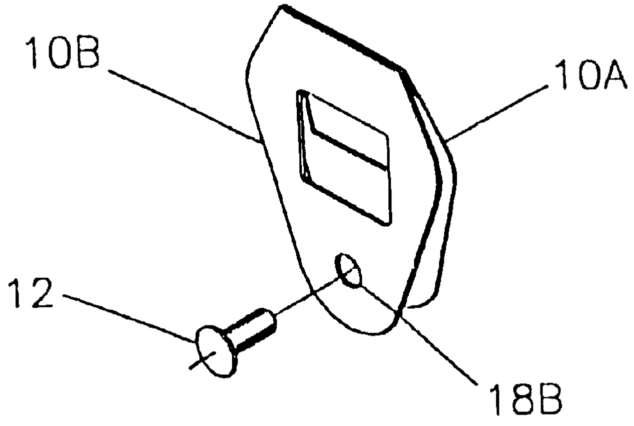
FIG. 3 is a perspective view of the fastener and its insertion point on the FLAP.

The fastener, FIG. 1 (12), is then inserted through the hole FIG. 3 (18A)(18B), through the pressure sensitive adhesive pieces FIG. 2 (20A)(20B) and into the other flap FIG. 4 (18A) or (18B) and secured.

SUMMARY, RAMIFICATION, AND SCOPE

Accordingly, the reader will see that the adjustable vertical blind slot repair kit can be used inexpensively and conveniently to repair broken or torn vertical blind slat connection points.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. In as much as the present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention.

Thus the scope of this invention should be determined by the appended claims and their legal equivalents, rather than by examples given.

What is claimed is:

1. An apparatus for repairing a slot in a vertical blind, comprising:

(1) a unitary body comprising:
- (a) a right side flap defining a right aperture and a left fastener hole;
- (b) a left side flap defining a left aperture and a left fastener hole; and
- (c) a fold line between the left side flap and the right side flap the fold line acting as an axis about which the left side flap and the right side flap rotate towards or away from each other, wherein the right side flap tapers inwardly to the fold line and wherein the left side flap tapers inwardly to the fold line;

(2) a right adhesive material attached to the right side flap, the right adhesive material facing the left side flap when the unitary body is folded along the fold line;

(3) a left adhesive material attached to the left side flap, the left adhesive material facing the right side flap when the unitary body is folded along the fold line; and (4) a fastener passing through the left fastener hole and the right fastener hole.

2. The apparatus of claim 1, wherein the right aperture is adapted to receive a backing hook of a rod hook assembly.

3. The apparatus of claim 1, wherein the left aperture is adapted to receive a backing lobe of a rod hook assembly.

4. The apparatus of claim 1, wherein the right aperture is a rectangular aperture that extends from a first distance from the fold line to a second distance from the fold line, wherein the left aperture is a rectangular aperture that extends from the first distance from the fold line to a third distance from the fold line, and wherein the third distance is greater than the second distance and the second distance is greater than the first distance.

5. The apparatus of claim 1, wherein the right adhesive material comprises a pressure sensitive foam and the left adhesive material comprises a pressure sensitive foam.

6. The apparatus of claim 1, wherein the unitary body comprises a flexible polymer.

7. The apparatus of claim 2, wherein the left adhesive material defines a left adhesive hole therein that aligns with the left fastener hole, wherein the right adhesive material defines a right adhesive hole therein that aligns with the right fastener hole.

8. The apparatus of claim 1, wherein the left side flap comprises a left flexible adjustment area between the left adhesive material and the fold line that is not in contact with the left adhesive, and wherein the right side flap comprises a right flexible adjustment area between the right adhesive material and the fold line that is not in contact with the right adhesive material.

9. An apparatus for repairing a slot in a vertical blind, comprising:

(1) a flexible polymeric unitary body comprising a flexible polymer, the unitary body comprising:

(a) a right side flap defining a right fastener hole and a right rectangular aperture, the right rectangular aperture adapted to receive a backing hook of a rod hook assembly;

(b) a left side flap defining a left fastener hole and a left rectangular aperture, the left rectangular aperture adapted to receive a backing lobe of a rod hook assembly; and (c) a fold line between the left side flap and the right side flap, the fold line acting as an axis about which the left side flap and the right side flap rotate towards or away from each other, wherein the right side flap tapers inwardly to the fold line and wherein the left side flap tapers inwardly to the fold line;

(2) an adhesive right pressure sensitive foam attached to the right side flap, the right pressure sensitive foaming facing the left side flap when the unitary body is folded along the fold line, the right pressure sensitive foam defining a hole therein that aligns with the right fastener hole, wherein the right side flap comprises a right flexible adjustment area between the right pressure sensitive foam and the fold line that is not in contact with the right pressure sensitive foam;

(3) an adhesive left pressure sensitive foam attached to the left side flap, the left pressure sensitive foam facing the right side flap when the unitary body is folded along the fold line, the left pressure sensitive foam defining a hole therein that aligns with the left fastener hole, wherein the left side flap comprises a left flexible adjustment area between the left pressure sensitive foam and the fold line that is not in contact with the left pressure sensitive foam; and (4) a fastener passing through the left fastener hole, the hole in the left pressure sensitive foam, the right fastener hole, and the hole in the right pressure sensitive foam.

* * * * *